US012587340B2

(12) United States Patent
Abdelghaffar et al.

(10) Patent No.: US 12,587,340 B2
(45) Date of Patent: Mar. 24, 2026

(54) ADAPTIVE PDSCH AND DMRS PATTERN FOR HST DEPLOYMENT

(71) Applicant: QUALCOMM Incorporated, San Diego, CA (US)

(72) Inventors: Muhammad Sayed Khairy Abdelghaffar, San Jose, CA (US); Hung Dinh Ly, San Diego, CA (US); Alexandros Manolakos, Escondido, CA (US); Gokul Sridharan, Sunnyvale, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 18/020,415

(22) PCT Filed: Aug. 11, 2021

(86) PCT No.: PCT/US2021/045586
§ 371 (c)(1),
(2) Date: Feb. 8, 2023

(87) PCT Pub. No.: WO2022/076080
PCT Pub. Date: Apr. 14, 2022

(65) Prior Publication Data
US 2024/0039671 A1      Feb. 1, 2024

(30) Foreign Application Priority Data

Oct. 8, 2020      (GR) .............................. 20200100607

(51) Int. Cl.
*H04L 5/00*      (2006.01)
*H04W 56/00*      (2009.01)

(52) U.S. Cl.
CPC .......... *H04L 5/0051* (2013.01); *H04L 5/0035* (2013.01); *H04W 56/0045* (2013.01)

(58) Field of Classification Search
None
See application file for complete search history.

(56) References Cited

U.S. PATENT DOCUMENTS 11,637,672 B2 *    4/2023    Saito ..................... H04L 5/0094
                                                              370/329
2019/0159181 A1 *    5/2019    Manolakos ........... H04W 72/23
(Continued)

FOREIGN PATENT DOCUMENTS

WO          2018203592 A1    11/2018

OTHER PUBLICATIONS

International Search Report and Written Opinion—PCT/US2021/045586—ISA/EPO—Nov. 26, 2021.
(Continued)

*Primary Examiner* — Saumit Shah
(74) *Attorney, Agent, or Firm* — Procopio, Cory, Hargreaves & Savitch LLP

(57)          ABSTRACT

Methods, computer program products, and apparatuses for adaptive PDSCH and DMRS pattern are provided. An example method may include receiving, from a UE, a frequency shift estimate including one or more frequency offsets, each of the one or more frequency offsets corresponding to each of one or more TRPs. The example method may further include selecting at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe. The example method may further include transmitting, to the UE, an indication of the at least one
(Continued)

1200

1202

Receive, from a user equipment (UE), a frequency shift estimate including one or more frequency offsets, each of the one or more frequency offsets corresponding to each of one or more TRPs

1206

Select at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe

1210

Transmit, to the UE, an indication of the at least one DMRS pattern selected based on the frequency shift estimate DMRS pattern selected based on the frequency shift estimate.

30 Claims, 15 Drawing Sheets

(56) References Cited

U.S. PATENT DOCUMENTS

| | | | | |
|---|---|---|---|---|
| 2020/0228970 A1* | 7/2020 | Noh | | H04W 8/245 |
| 2021/0281374 A1 | 9/2021 | Kim et al. | | |
| 2022/0224481 A1* | 7/2022 | Yu | | H04L 5/0094 |
| 2022/0400050 A1* | 12/2022 | Miao | | H04W 72/51 |
| 2023/0171065 A1* | 6/2023 | Mei | | H04L 5/0051 |
| | | | | 370/329 |
| 2023/0216711 A1* | 7/2023 | Yao | | H04L 5/0051 |
| | | | | 370/328 |
| 2023/0318688 A1* | 10/2023 | Huang | | H04L 5/0051 |
| | | | | 370/329 |

OTHER PUBLICATIONS

Lenovo, et al., "Enhancements for HST-SFN Deployment", 3GPP Draft, 3GPP TSG RAN WG1 #102e, R1-2005925, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020 (Aug. 8, 2020), XP051917818, pp. 1-7, section 3, figure 5.

Qualcomm Incorporated: "Enhancements on HST-SFN Deployment", 3GPP Draft, 3GPP TSG-RAN WG1 Meeting #102-e, R1-2006794, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020 (Aug. 8, 2020), XP051918244, 15 pages, sections 4.1 and 4.3, figures 4-3.

* cited by examiner

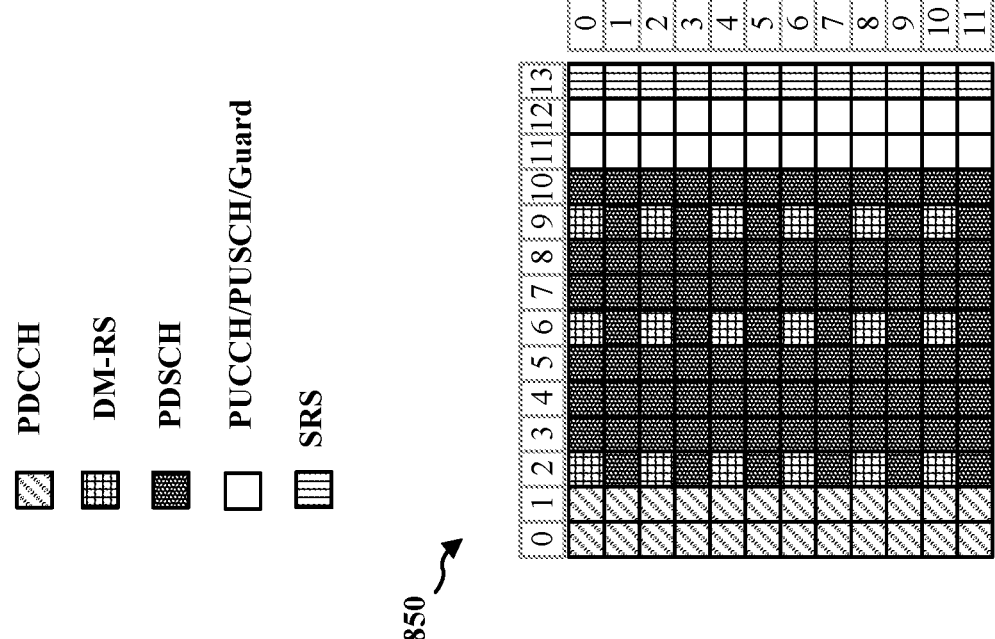
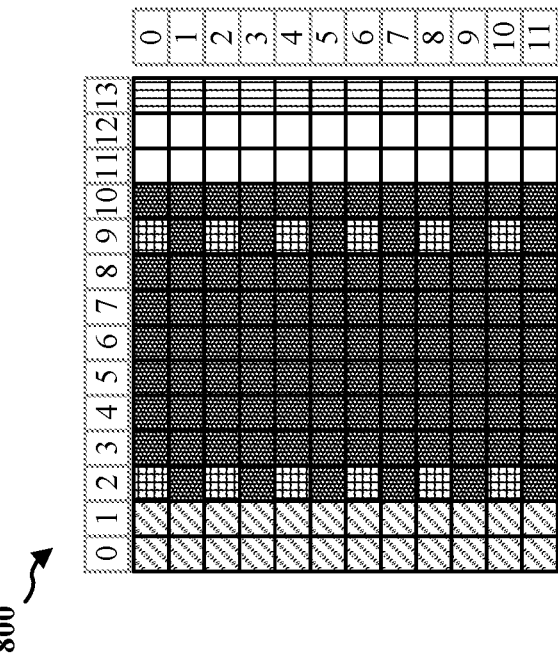
FIG. 8

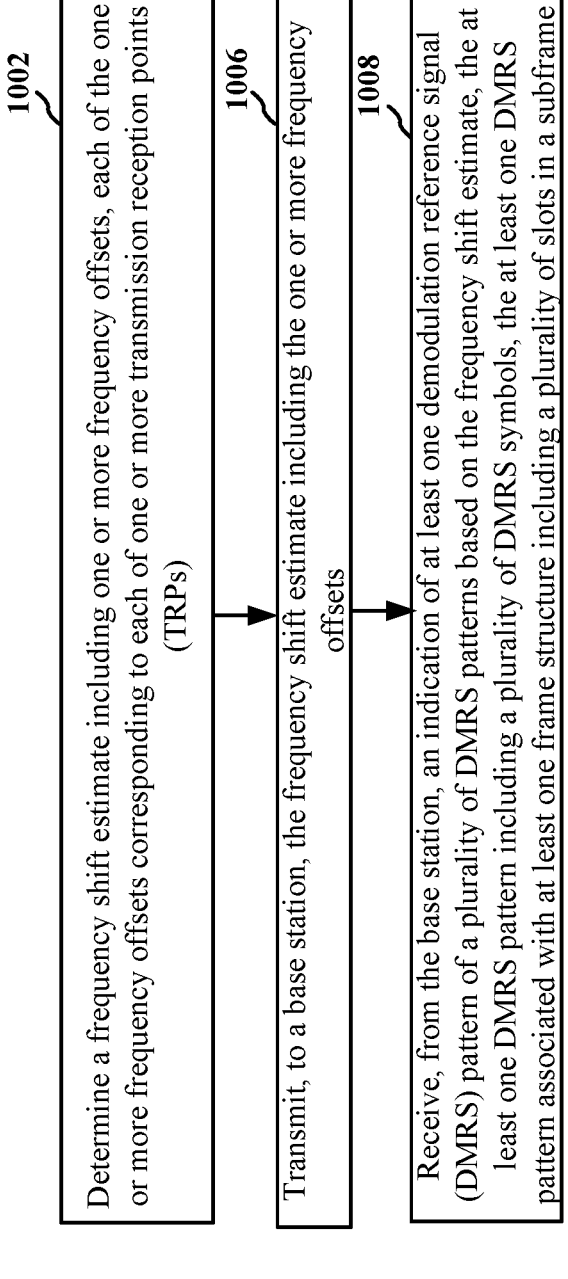

1002

Determine a frequency shift estimate including one or more frequency offsets, each of the one or more frequency offsets corresponding to each of one or more transmission reception points (TRPs)

1006

Transmit, to a base station, the frequency shift estimate including the one or more frequency offsets

1008

Receive, from the base station, an indication of at least one demodulation reference signal (DMRS) pattern of a plurality of DMRS patterns based on the frequency shift estimate, the at least one DMRS pattern including a plurality of DMRS symbols, the at least one DMRS pattern associated with at least one frame structure including a plurality of slots in a subframe

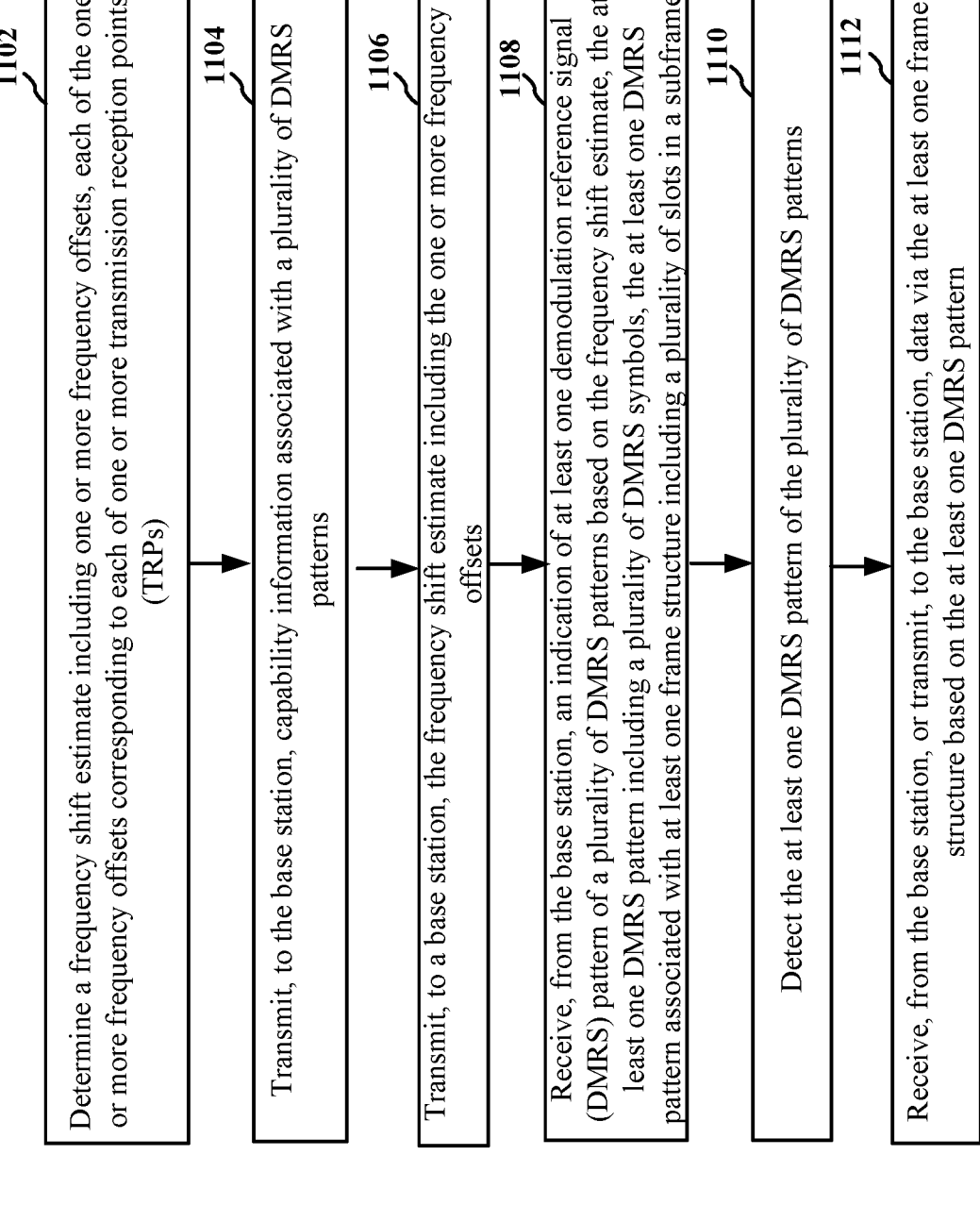

1100

1102
Determine a frequency shift estimate including one or more frequency offsets, each of the one or more frequency offsets corresponding to each of one or more transmission reception points (TRPs)

1104
Transmit, to the base station, capability information associated with a plurality of DMRS patterns 1106
Transmit, to a base station, the frequency shift estimate including the one or more frequency offsets 1108
Receive, from the base station, an indication of at least one demodulation reference signal (DMRS) pattern of a plurality of DMRS patterns based on the frequency shift estimate, the at least one DMRS pattern including a plurality of DMRS symbols, the at least one DMRS pattern associated with at least one frame structure including a plurality of slots in a subframe 1110
Detect the at least one DMRS pattern of the plurality of DMRS patterns 1112
Receive, from the base station, or transmit, to the base station, data via the at least one frame structure based on the at least one DMRS pattern

FIG. 11

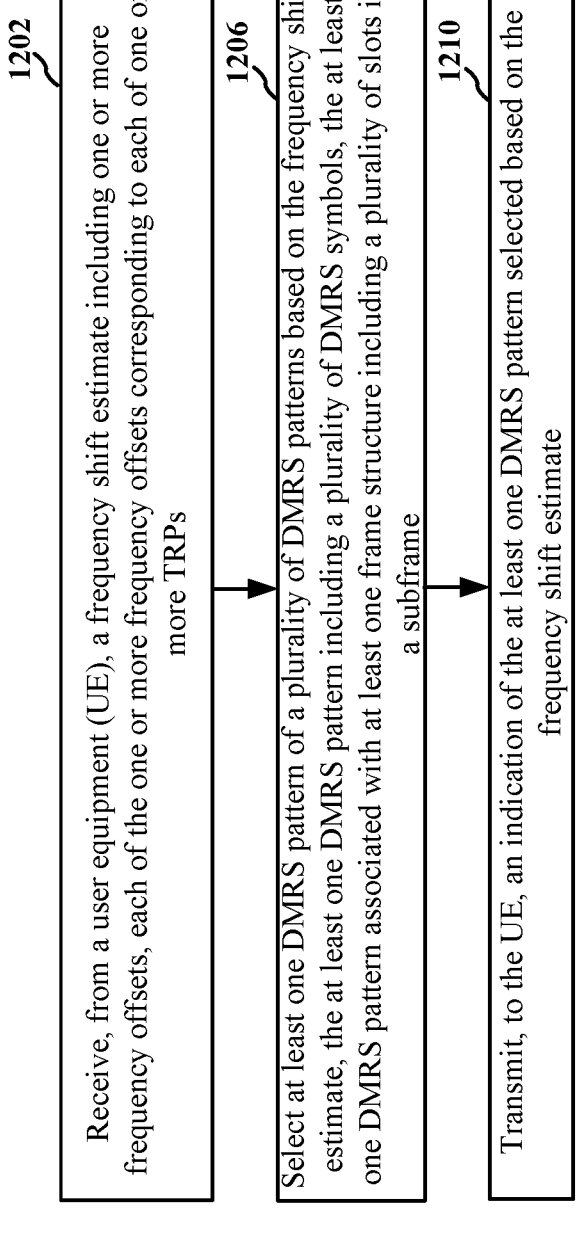

1200

1202

Receive, from a user equipment (UE), a frequency shift estimate including one or more frequency offsets, each of the one or more frequency offsets corresponding to each of one or more TRPs

1206

Select at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe

1210

Transmit, to the UE, an indication of the at least one DMRS pattern selected based on the frequency shift estimate

FIG. 12

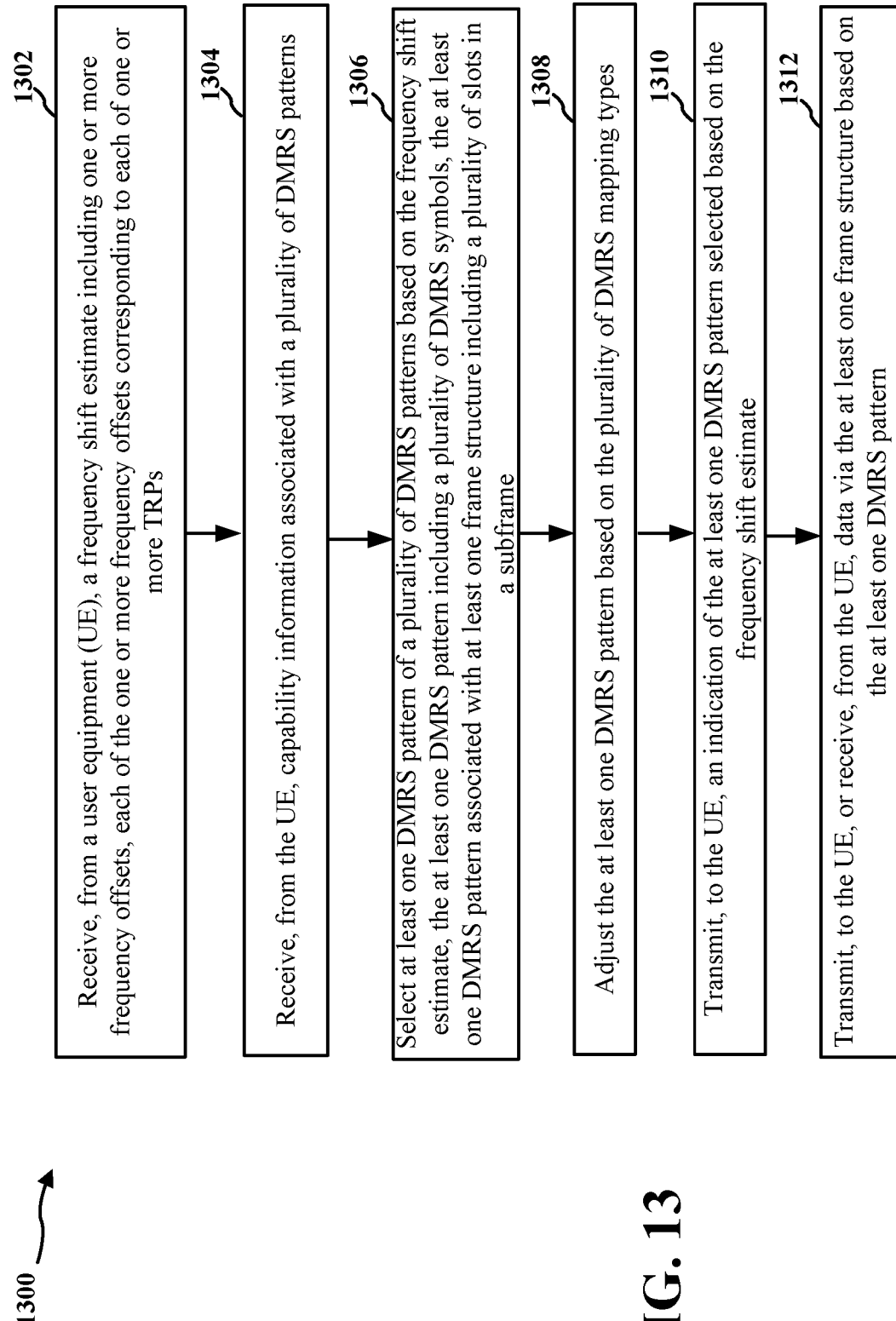

1300

1302 Receive, from a user equipment (UE), a frequency shift estimate including one or more frequency offsets, each of the one or more frequency offsets corresponding to each of one or more TRPs 1304 Receive, from the UE, capability information associated with a plurality of DMRS patterns 1306 Select at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe 1308 Adjust the at least one DMRS pattern based on the plurality of DMRS mapping types 1310 Transmit, to the UE, an indication of the at least one DMRS pattern selected based on the frequency shift estimate 1312 Transmit, to the UE, or receive, from the UE, data via the at least one frame structure based on the at least one DMRS pattern

FIG. 13

ADAPTIVE PDSCH AND DMRS PATTERN FOR HST DEPLOYMENT

CROSS REFERENCE TO RELATED APPLICATIONS

This application is a National Stage Application filed under 35 U.S.C. § 371 of PCT International Application Serial No. PCT/US2021/045586 entitled "ADAPTIVE PDSCH AND DMRS PATTERN FOR HST DEPLOY-MENT" and filed on Aug. 11, 2021, which claims the benefit of and priority to Greek Patent Application Serial No. 20200100607, entitled "ADAPTIVE PDSCH AND DMRS PATTERN FOR HST DEPLOYMENT" and filed on Oct. 8, 2020, which are expressly incorporated by reference herein in their entirety.

TECHNICAL FIELD

The present disclosure relates generally to communication systems, and more particularly, to a wireless communication with adaptive physical downlink shared channel (PDSCH) and demodulation reference signal (DMRS) patterns.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, computer programs products, and apparatuses for adaptive PDSCH and DMRS pattern are provided. In one aspect of the disclosure, a method, a computer-readable medium, and an apparatus are provided for wireless communication at a base station. A base station may receive, from a user equipment (UE), a frequency shift estimate including one or more frequency offsets, each of the one or more frequency offsets corresponding to each of one or more transmission reception points (TRPs). The base station may select at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe. The base station may transmit, to the UE, an indication of the at least one DMRS pattern selected based on the frequency shift estimate.

In another aspect of the disclosure, a method, a computer-readable medium, and an apparatus are provided for wireless communication at a UE. The UE may determine a frequency shift estimate including one or more frequency offsets, each of the one or more frequency offsets corresponding to each of one or more TRPs. The UE may transmit, to a base station, the frequency shift estimate including the one or more frequency offsets. The UE may receive, from the base station, an indication of at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 illustrates examples of DMRS patterns.

FIG. 10 is a flowchart of a method of wireless communication.

FIG. 11 is a flowchart of a method of wireless communication.

FIG. 12 is a flowchart of a method of wireless communication.

FIG. 13 is a flowchart of a method of wireless communication.

DETAILED DESCRIPTION

Figure 1:
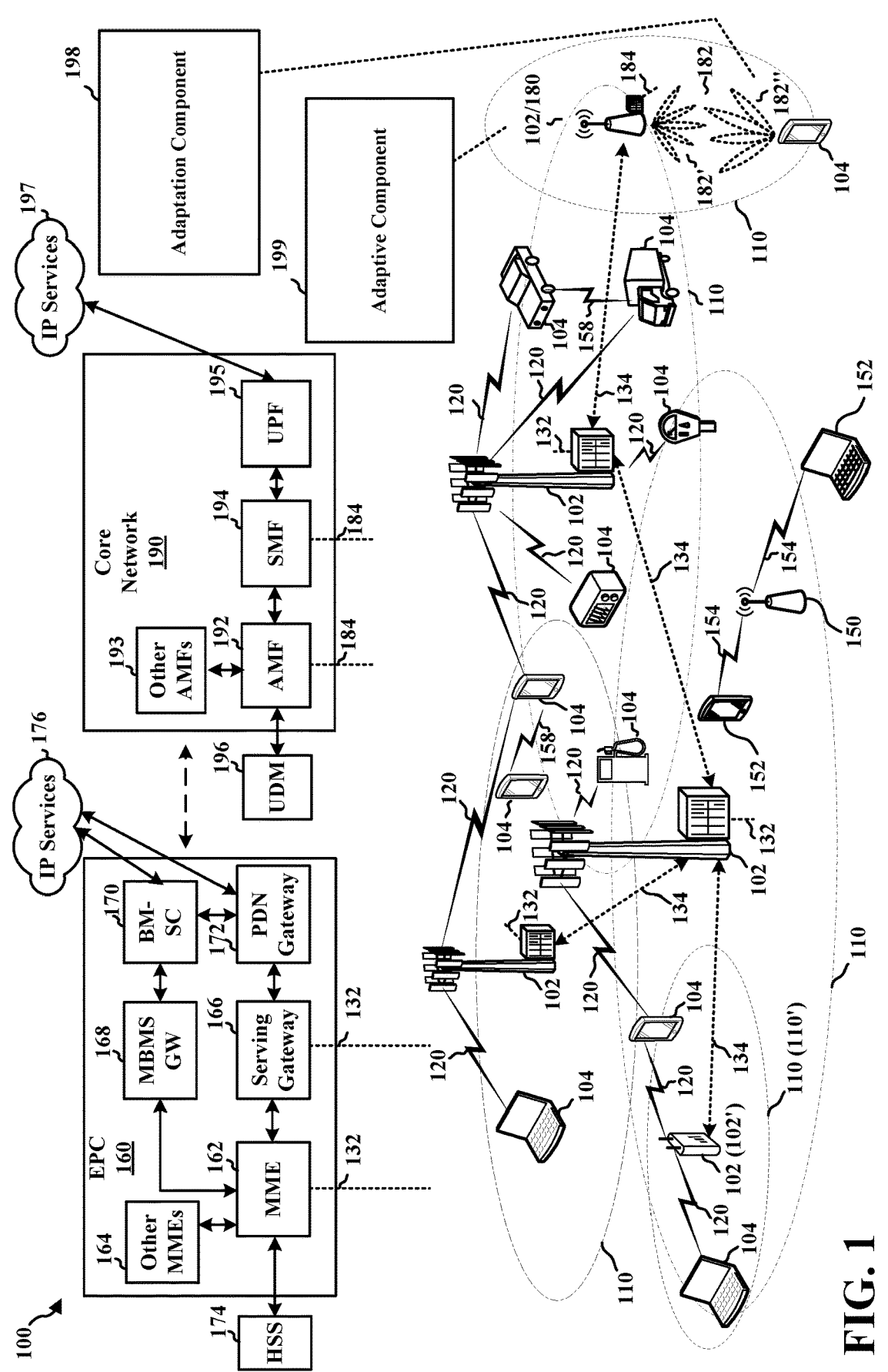
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (IMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN)Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include adaptation component 198. The adaptation component 198 may be configured to determine a frequency shift estimate including one or more frequency offsets, each of the one or more frequency offsets corresponding to each of one or more TRPs. The adaptation component 198 may be configured to transmit, to a base station, the frequency shift estimate including the one or more frequency offsets. The adaptation component 198 may be configured to receive, from the base station, an indication of at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe.

In some aspects, the base station 180 may include adaptive component 199. The adaptive component 199 may be configured to receive, from a UE, a frequency shift estimate including one or more frequency offsets, each of the one or more frequency offsets corresponding to each of one or more TRPs. The adaptive component 199 may be configured to select at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe. The adaptive component 199 may be configured to transmit, to the UE, an indication of the at least one DMRS pattern selected based on the frequency shift estimate.

Although the following description may be focused on 5G NR, the concepts described herein may be applicable to other similar areas, such as LTE, LTE-A, CDMA, GSM, and other wireless technologies.

Figures 2A, 2B, 2C, 2D:
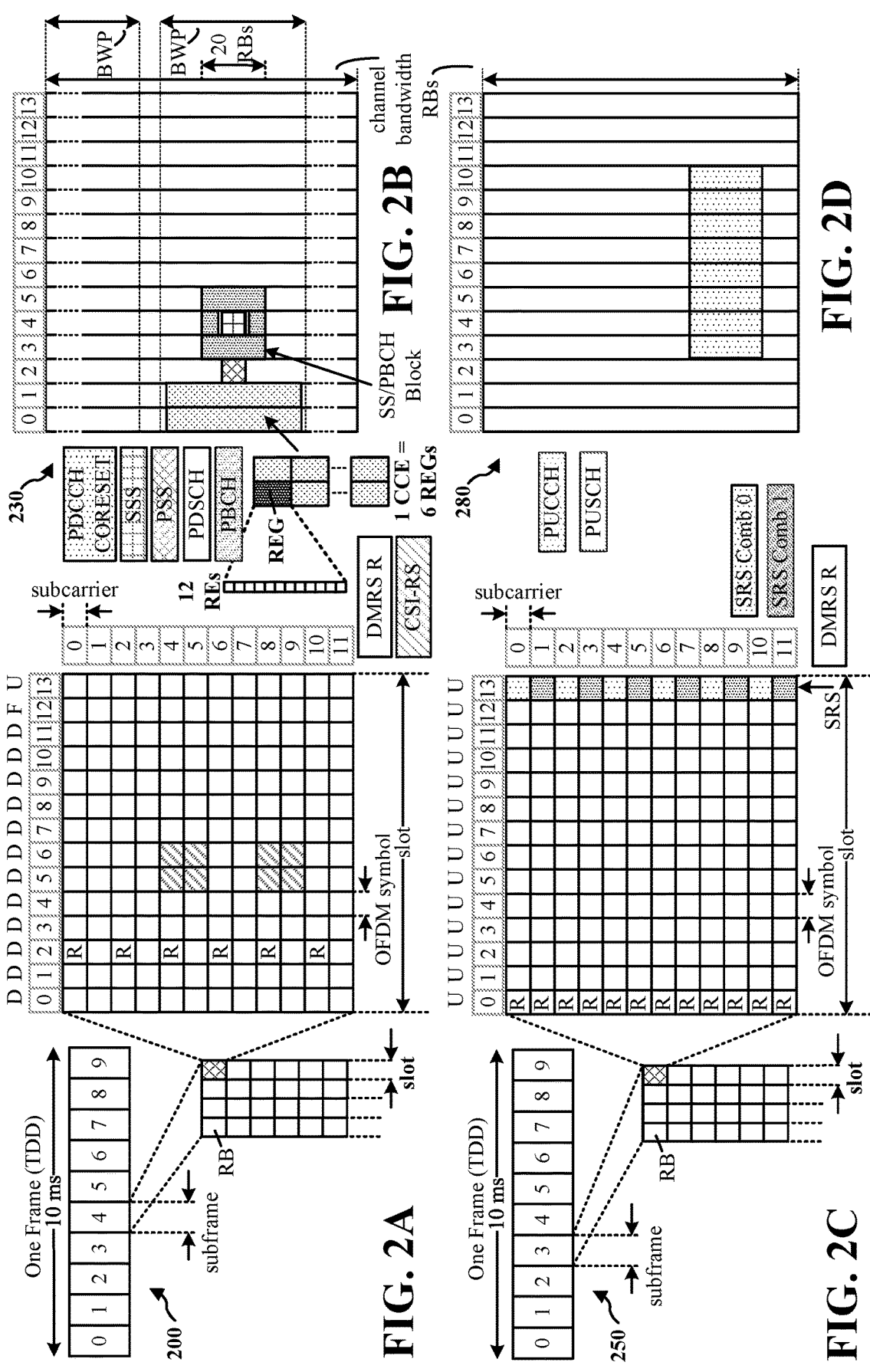
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at higher and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
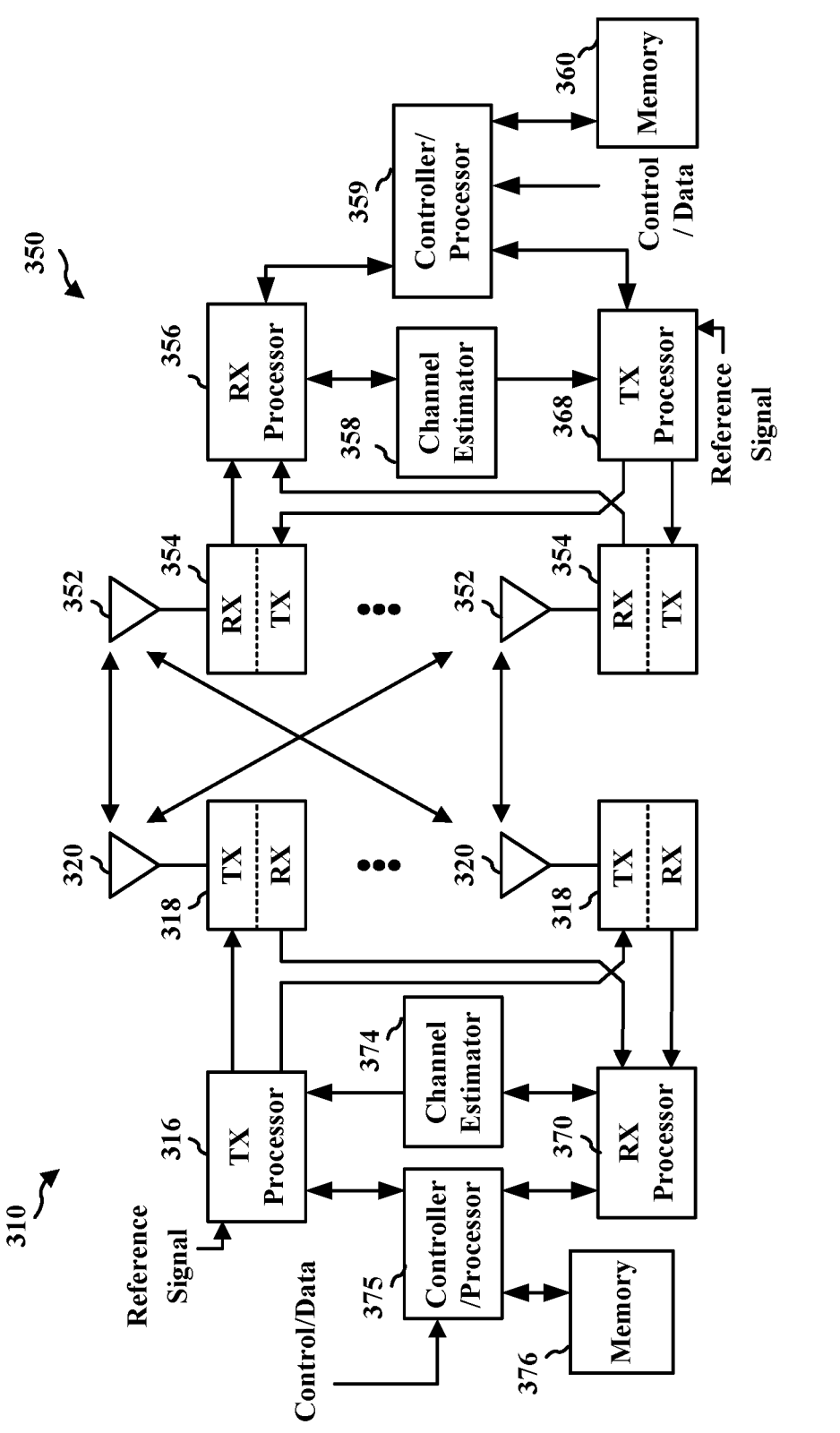
FIG. 3 is a diagram illustrating an example of a base station and a user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with adaptation component 198 of FIG. 1.

At least one of the TX processor 316, the RX processor 370, and the controller/processor 375 may be configured to perform aspects in connection with adaptive component 199 of FIG. 1.

Figure 4:
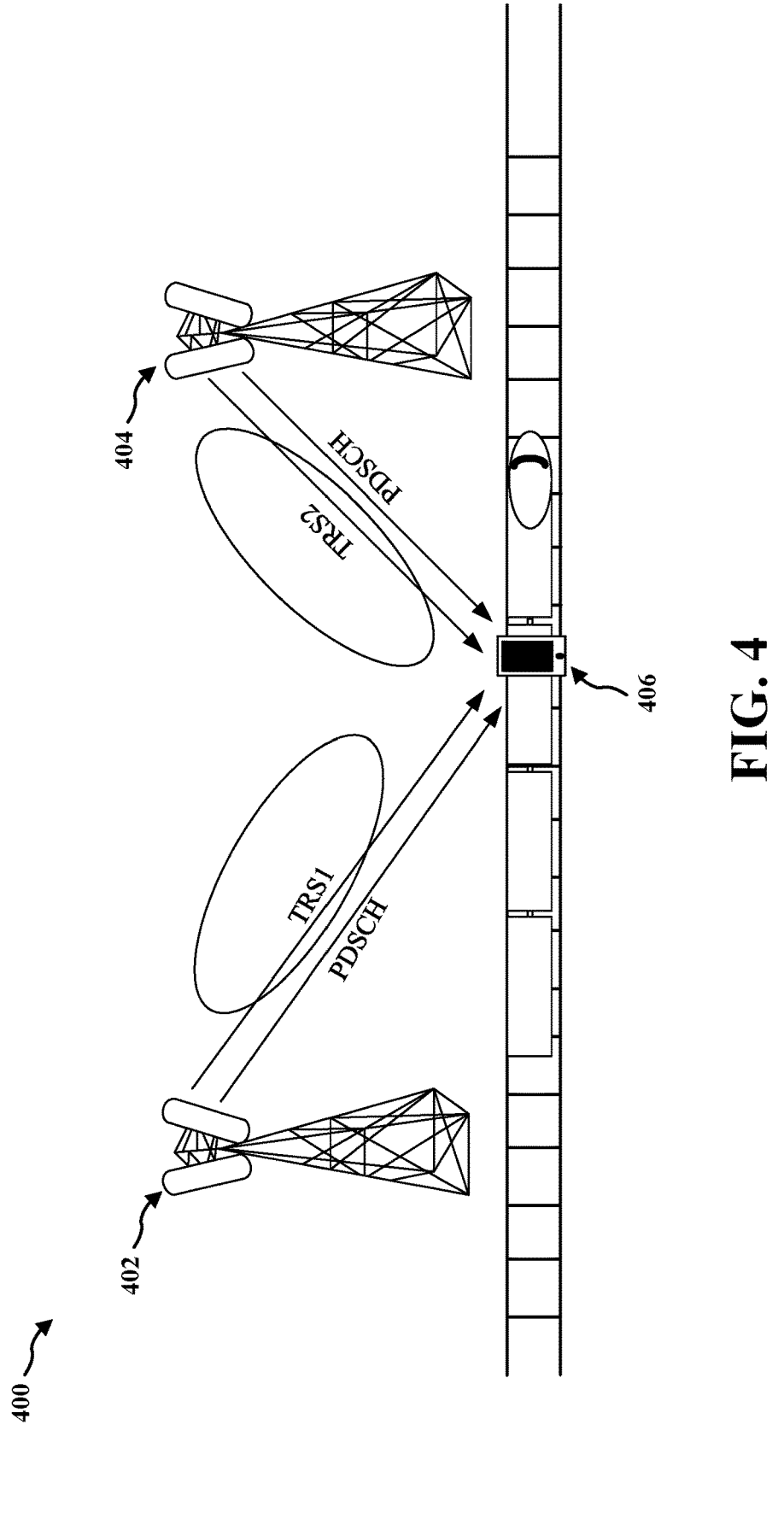
FIG. 4 illustrates an example high-speed train (HST) environment.

In some wireless communication systems, such as communication systems for high-speed train (HST)-single frequency network (SFN) deployment, DL performance improvement mechanisms may be used to address the challenges presented in the environment. Configuration of multiple quasi co-location (QCL) assumptions (TCI states) for the DMRS of PDSCH and PDCCH may be used. For example, a UE can use the indicated QCL RS sources (CSI-RS or tracking reference signal (TRS)) to estimate the Doppler shift of each TRP and also the Rx beam to be used. As illustrated in example 400 in FIG. 4, a first TRP 402 and a second TRP 404 may each transmit separate TRS and a same PDSCH to a UE 406 on an HST.

Figure 5:
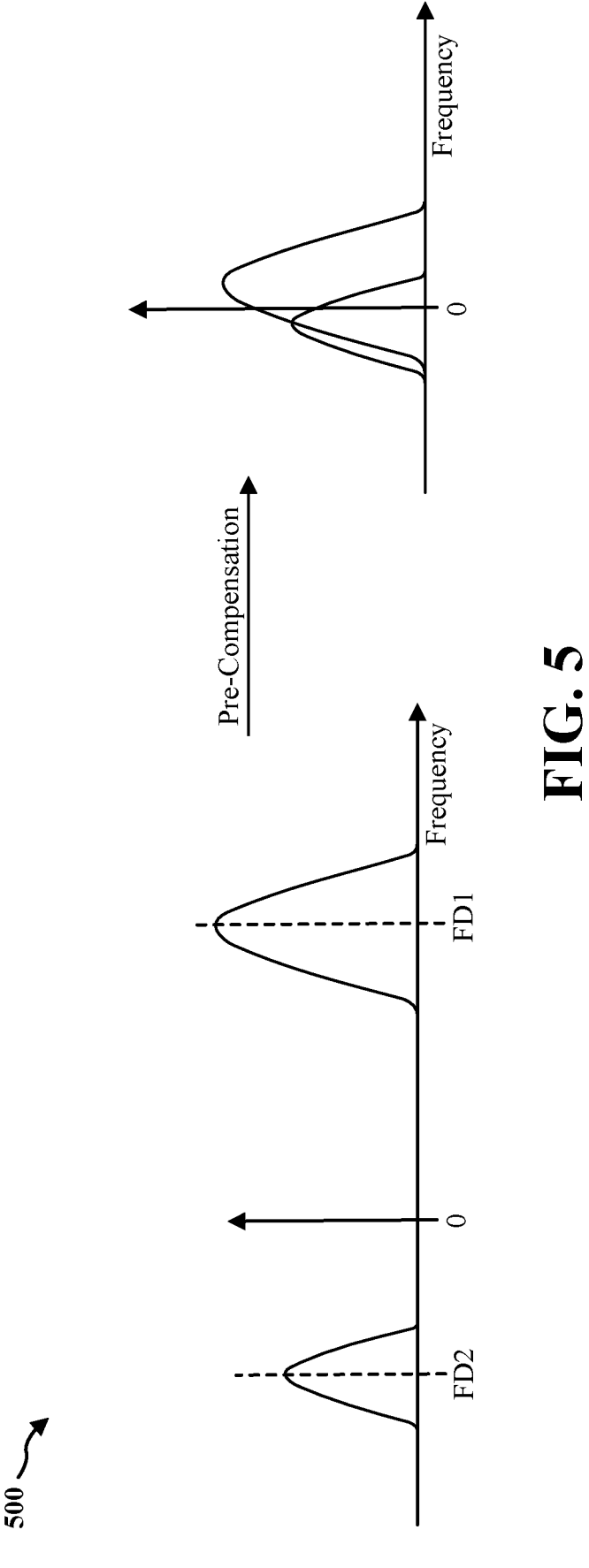
FIG. 5 illustrates example pre-compensation's effect on Doppler shifts.

As illustrated in example 500 in FIG. 5, in order to improve the DL performance, the network (e.g., the base stations) may pre-compensate the DL signal from each TRP with the opposite Doppler shift (i.e., frequency offset) such that the UE may experience a small Doppler spectrum of the DL signal. As further illustrated in FIG. 5, with pre-compensation, the Doppler spectrum of the signals received from each TRP at FD2 and FD1 may arrive at a much closer frequency to the DC. Such pre-compensation may be performed by the network based on UL signals such as SRS or may be performed based on UE reporting of Doppler shifts.

Figure 6:
FIG. 6 illustrates examples of Doppler shifts.

As illustrated in FIG. 6, example 600 includes example Doppler shift effects. At different track locations, the UE may experience different Doppler shift values based on the UE speed and UE location with respect to the TRP. When the UE is close to the TRP, it may experience small to medium Doppler shifts (e.g., when the is located between track locations −200 to 200 m). However, when the UE gets further away from the TRP, it may experience larger Doppler shifts. With a large value of Doppler shift, DL performance may degrade due to lower quality of DMRS channel estimation. To improve the DL performance, higher DMRS density may be used. However, on the other hand, if the Doppler shift is low or medium intensity, then the reduced DMRS overhead with a lower DMRS density may increase DL throughput which may in turn increase DL performance. Therefore, in some aspects, DMRS adaptation (i.e., selecting a DMRS pattern with a suitable density of DMRS) may be provided to improve DL performance. In some aspects, DMRS adaptation may be dynamic based on the network's indication of pre-compensation.

Figure 7:
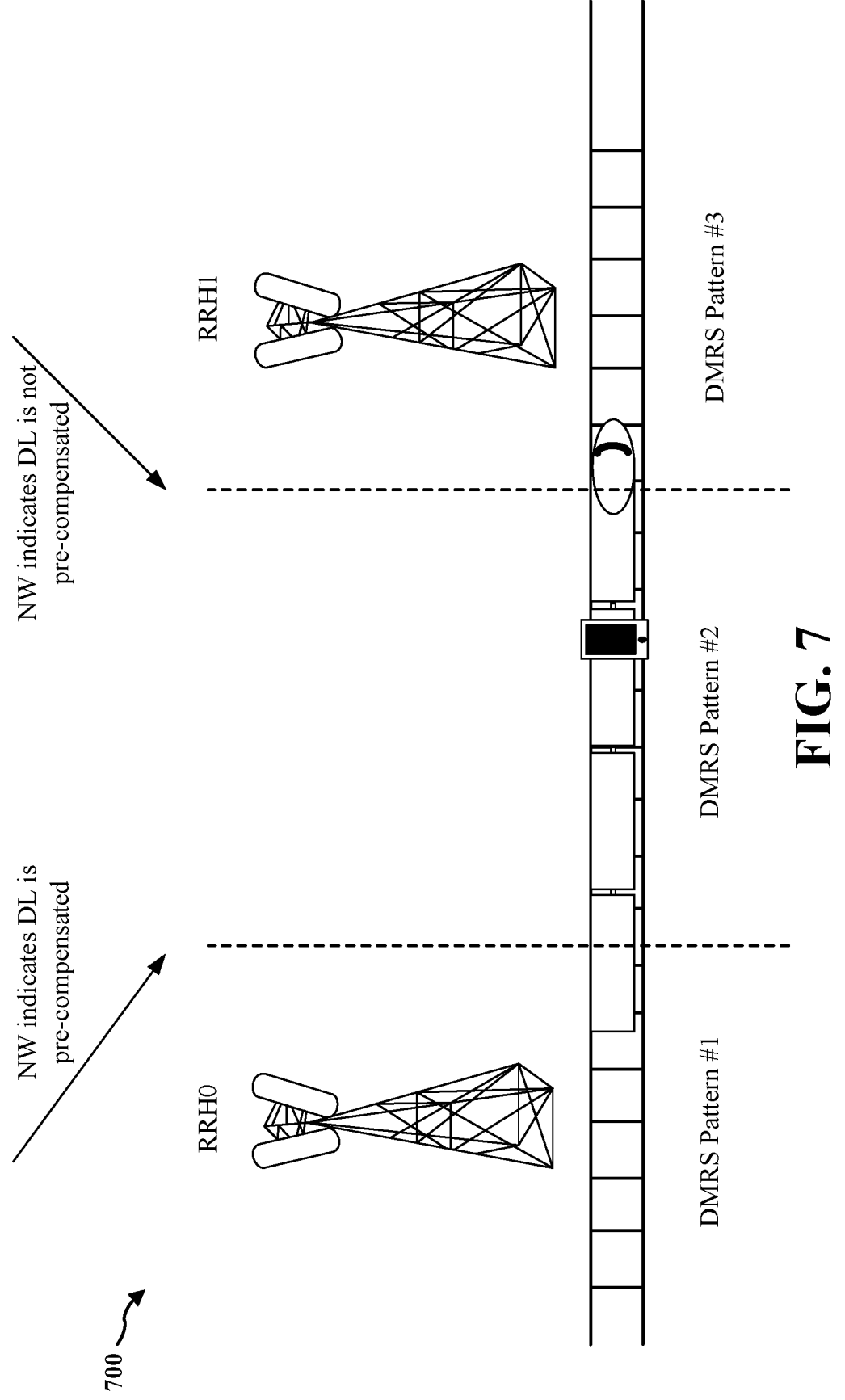
FIG. 7 illustrates example communications between a UE and two base stations.

As illustrated in example 700 in FIG. 7, in a multiple TRP (multi-TRP) transmission, the network may dynamically indicate to the UE whether DL transmission is Doppler shift pre-compensated or not. When the DL transmission is precompensated, the UE may experience a small Doppler spectrum and a low-DMRS density (e.g., DMRS pattern #2). When the DL transmission is not pre-compensated, the UE may experience a larger Doppler spectrum and a high-density DMRS pattern may be indicated (e.g., DMRS pattern #1). DMRS adaptation provided herein may be applicable for M-TRP (both SFN and non-SFN transmission) and single TRP schemes. DMRS adaptation provided herein may also be applicable for both schemes of SFN transmission (i.e., SFNed DMRS and non-SFN DMRS). Additionally, as illustrated in FIG. 8, example 800 includes a DMRS pattern with a lower DMRS density which may be suitable for DMRS pattern #2 in example 700, and example 850 includes a DMRS pattern with a higher DMRS density suitable for DMRS pattern #1 in example 700.

In some aspects, the network may configure two DMRS patterns and implicitly indicate one of the DMRS patterns based on the indicated value of Doppler shift (DS) precompensation. For example, the network may configure two RRC parameters of DMRS-additionalPosition={pos1, pos2}, and then based on the pre-compensation={1, 0}, one of the DMRS patterns with either additional DMRS position pos1 or pos2 may be chosen.

Figure 9:
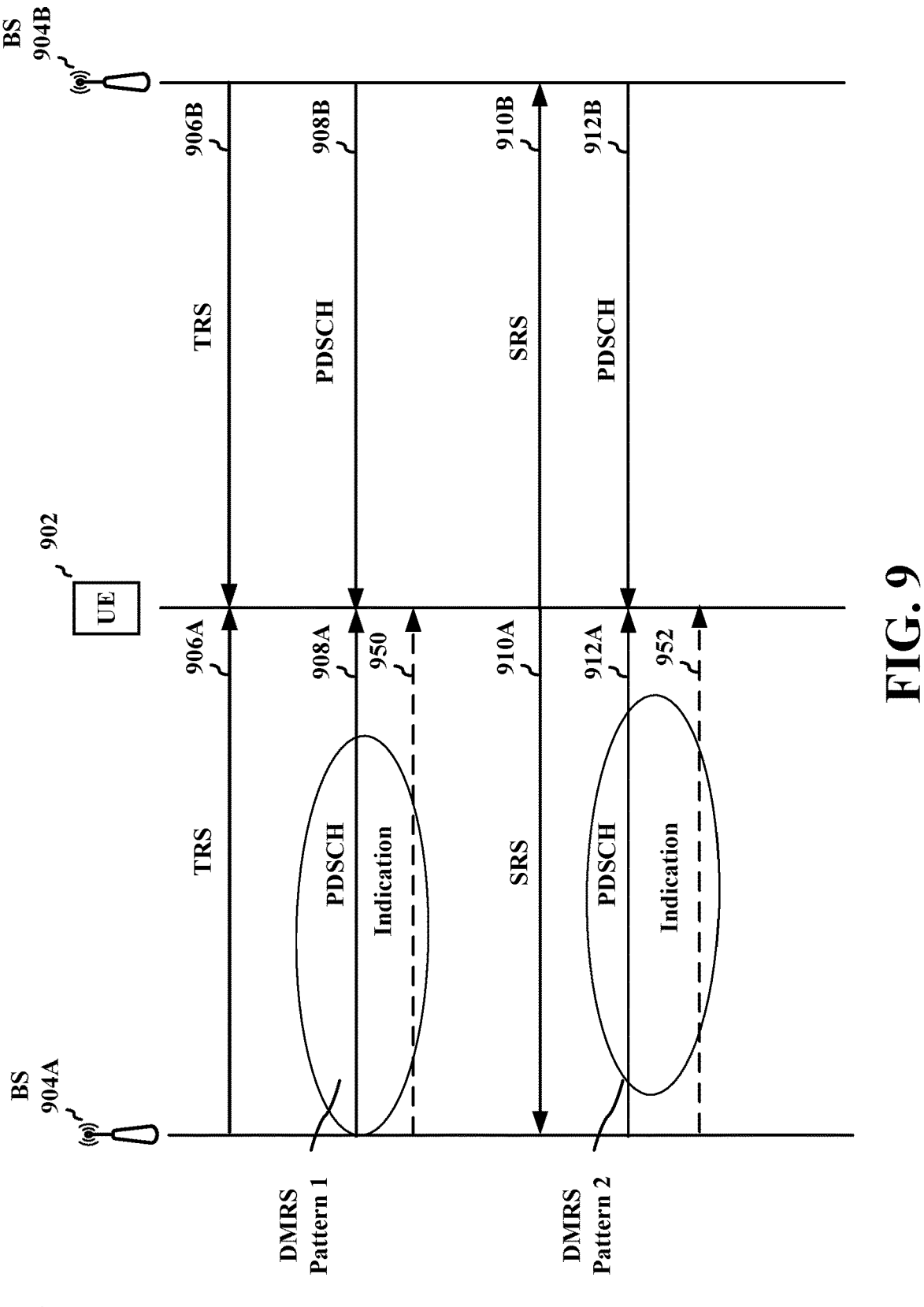
FIG. 9 illustrates example communications between a UE and two base stations.

As illustrated in example 900 in FIG. 9, a UE 902 may estimate frequency shifts for each TRP based on TRS 906A and TRS 906B sent by base station 904A and a base station 904B. The UE 902 may receive a PDSCH, such as SFN PDSCH 908A or SFN PDSCH 908B and PDSCH 912A or PDSCH 912B from the base station 904A and the base station 904B. The UE may inform the base station with estimated frequency shifts based on SRS 910A and SRS 910B. Based on the estimates, different DMRS patterns may be selected. For example, a first DMRS pattern (DMRS pattern 1) may be used for the SFN PDSCH 908A or SFN PDSCH 908B transmitted from the base station 904A or the base station 904B to the UE 902. In some aspects, the UE 902 may receive a pre-compensation indication 950 or a pre-compensation indication 952 from the base station 904A and may receive a set of DMRS patterns to be selected (such as received via RRC signaling) based on whether precompensation is utilized. In some aspects, if the UE 902 has not received a pre-compensation indication, the UE 902 may choose a denser DMRS pattern in the RRC-configured set of DMRS patterns for both TRPs. In some aspects, a default DMRS pattern may be defined (e.g., pre-defined). For example, a first index of the multiple RRC configured patterns may be provided as the default DMRS pattern. In another example, a particular pattern such as a 3-symbol DMRS pattern may be selected as the default DMRS pattern.

In some aspects, there may be dedicated RRC configuration of DMRS mapping type A and type B that includes the DMRS type, DMRS additional position, maximum length, or the like. In some aspects, a per-mapping type DMRS pattern adaptation may be provided. For example, the DCI may indicate the index pointing to Type-A or Type-B, therefore implicitly change the DMRS pattern across types. Based on the pre-compensation indicated, e.g., (1,0) or (enabled, disabled), a DMRS pattern per-mapping type may be configured.

In some aspects, the UE 902 may implicitly or explicitly indicate to the network (e.g., by signaling to the base stations 904A and 904B) the Doppler shift(s) experienced from each TRP (e.g., the base stations 904A and 904B) in a channel state information (CSI) report. Because the Doppler shift is different (sign and magnitude) for each TRP, the DMRS adaption may be TRP specific. For example, if scheme 1 (SFNed DMRS) is adopted, then a same number DMRS symbol (or DMRS pattern) may be used. In another example, if scheme 2 (non-SFN DMRS) is adopted, then each TRP may utilize a different DMRS pattern. In some aspects, the network may configure (e.g., preconfigure via RRC signaling), one or more Doppler threshold(s) and multiple DMRS patterns (e.g., additional DMRS-positions) with a one-to-one mapping based on the range. For example, a DMRS pattern 1 may be mapped to an absolute value of Doppler shift (abs(Doppler shift))<=Threshold 1, a DMRS pattern 2 may be mapped to Threshold 1<abs(Doppler shift)<=Threshold 2, and a DMRS pattern 3 may be mapped to abs(Doppler shift)>Threshold 2.

In some aspects, the UE 902 may autonomously detect the DMRS pattern. Based on RRC configurations of possible/candidate DMRS patterns, the UE may try multiple hypotheses. The detection by the UE may be enhanced based on the estimated Doppler shift (from a TRS) or by network configuration of a DMRS. For example, for a Type-A and PDSCH duration=12, a UE may be RRC configured with three (3) values of extra positions (pos1, pos2, pos3) mapped to $(l_0, l_0+6, l_0+6+9)$. For symbol index 6 and symbol index 9, the UE may detect whether the symbol includes a DMRS or not. In some aspects, a candidate DMRS symbol may not be frequency division duplexed (FDMed) with data within the same time.

In some aspects, the UE 902 may report the capability to support multiple DMRS patterns for the same DMRS configuration type and PDSCH duration to the base stations 904A and 904B.

In some aspects, the UE 902 may report the capability of autonomously detection DMRS pattern to the base stations 904A and 904B.

FIG. 10 is a flowchart 1000 of a method of wireless communication. The method may be performed by a UE (e.g., the UE 104 and the UE 902; the apparatus 1402).

At 1002, the UE determines a frequency shift estimate including one or more frequency offsets, each of the one or more frequency offsets corresponding to each of one or more TRPs. For example, the UE 902 may determine a frequency shift estimate including one or more frequency offsets based on TRS 906A and TRS 906B. In some aspects, 1002 may be performed by estimation component 1440 in FIG. 14. In some aspects, each of the one or more frequency offsets may correspond to a Doppler shift for each of the one or more TRPs. In some aspects, the one or more TRPs may be associated with a SFN. Each of the one or more TRPs may correspond to a same amount of DMRS symbols in each of the plurality of DMRS patterns. In some aspects, the one or more TRPs are associated with a non-single frequency network (non-SFN), each of the one or more TRPs may correspond to a different DMRS pattern of the plurality of DMRS patterns.

At 1006, the UE transmits, to a base station, the frequency shift estimate including the one or more frequency offsets. For example, the UE 902 may transmit, to the base station 904A or the base station 904B, the frequency shift estimate via the SRS 910A or the SRS 910B. In some aspects, 1006 may be performed by estimate transmission component 1442 in FIG. 14.

At 1008, the UE receives, from the base station, an indication of at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe. For example, the UE 902 may receive, from the base station 904A or the base station 904B, an indication (such as the indication 950 or the indication 952) of at least one DMRS pattern of a plurality of DMRS patterns based on the frequency shift estimate. In some aspects, 1008 may be performed by indication reception component 1444 in FIG. 14. In some aspects, the at least one DMRS pattern may correspond to two DMRS patterns. In some aspects, each of the plurality of DMRS patterns may be RRC configured or predefined. In some aspects, the at least one DMRS pattern may correspond to two DMRS patterns, one of the two DMRS patterns may be associated with a Doppler shift pre-compensation being enabled and another of the two DMRS patterns may be associated with the Doppler shift pre-compensation not being enabled. In some aspects, each of the two DMRS patterns may be configured based on a position and a number of one or more additional DMRS symbols. In some aspects, the at least one DMRS pattern may be selected based on one of the plurality of DMRS patterns including a highest amount of DMRS symbols. In some aspects, a specific DMRS pattern may correspond to a data transmission when an indication of a Doppler shift pre-compensation is absent. In some aspects, the at least one DMRS pattern may be a first DMRS pattern or a last DMRS pattern of the plurality of DMRS patterns, the plurality of DMRS patterns may be configured via RRC signaling. In some aspects, each of the plurality of DMRS patterns may include an index and the at least one DMRS pattern may be selected based on the index for each of the plurality of DMRS patterns. In some aspects, the plurality of DMRS patterns may be configured via RRC signaling, each of the plurality of DMRS patterns including a specific configuration of a number of additional DMRS symbols. In some aspects, the at least one DMRS pattern may be selected based on a Doppler shift. In some aspects, the at least one DMRS pattern of the plurality of DMRS patterns is detected by the UE. In some aspects, one of the plurality of DMRS patterns may be a default DMRS pattern and the at least one DMRS pattern may correspond to the default DMRS pattern. In some aspects, the plurality of DMRS patterns may correspond to a plurality of DMRS mapping types. In some aspects, each of the plurality of DMRS mapping types may be associated with at least one of a DMRS type, multiple DMRS additional positions, a DMRS group, a maximum length, a scrambling ID, or a phase TRS. In some aspects, the multiple DMRS additional positions may be equal to two DMRS additional positions, the two DMRS additional positions may be configured, one of the two DMRS additional positions may be selected based on the indication of the at least one DMRS pattern. In some aspects, the indication of the at least one DMRS pattern may be based on an indication of at least one Doppler shift pre-compensation. In some aspects, the indication of one of the two DMRS patterns may be associated with a value of the at least one Doppler shift pre-compensation.

FIG. 11 is a flowchart 1100 of a method of wireless communication. The method may be performed by a UE (e.g., the UE 104 and the UE 902; the apparatus 1402).

At 1102, the UE determines a frequency shift estimate including one or more frequency offsets, each of the one or more frequency offsets corresponding to each of one or more TRPs. For example, the UE 902 may determine a frequency shift estimate including one or more frequency offsets based on TRS 906A and TRS 906B. In some aspects, 1102 may be performed by estimation component 1440 in FIG. 14. In some aspects, each of the one or more frequency offsets may correspond to a Doppler shift for each of the one or more TRPs. In some aspects, the one or more TRPs may be associated with a SFN. Each of the one or more TRPs may correspond to a same amount of DMRS symbols in each of the plurality of DMRS patterns. In some aspects, the one or more TRPs are associated with a non-single frequency network (non-SFN), each of the one or more TRPs may correspond to a different DMRS pattern of the plurality of DMRS patterns.

In some aspects, at 1104, the UE transmits, to the base station, capability information associated with the plurality of DMRS patterns. For example, the UE 902 may transmit, to the base station 904A and the base station 904B, capability information associated with the plurality of DMRS patterns. In some aspects, the capability information may be transmitted via RRC signaling. In some aspects, 1104 may be performed by transmission component 1434 in FIG. 14.

At 1106, the UE transmits, to a base station, the frequency shift estimate including the one or more frequency offsets. For example, the UE 902 may transmit, to the base station 904A or the base station 904B, the frequency shift estimate via the SRS 910A or the SRS 910B. In some aspects, 1106 may be performed by estimate transmission component 1442 in FIG. 14.

At 1108, the UE receives, from the base station, an indication of at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe. For example, the UE 902 may receive, from the base station 904A or the base station 904B, an indication (such as the indication 950 or the indication 952) of at least one DMRS pattern of a plurality of DMRS patterns based on the frequency shift estimate. In some aspects, 1108 may be performed by indication reception component 1444 in FIG. 14. In some aspects, the at least one DMRS pattern may correspond to two DMRS patterns. In some aspects, each of the plurality of DMRS patterns may be RRC configured or predefined. In some aspects, the at least one DMRS pattern may correspond to two DMRS patterns, one of the two DMRS patterns may be associated with a Doppler shift pre-compensation being enabled and another of the two DMRS patterns may be associated with the Doppler shift pre-compensation not being enabled. In some aspects, each of the two DMRS patterns may be configured based on a position and a number of one or more additional DMRS symbols. In some aspects, the at least one DMRS pattern may be selected based on one of the plurality of DMRS patterns including a highest amount of DMRS symbols. In some aspects, a specific DMRS pattern may correspond to a data transmission when an indication of a Doppler shift pre-compensation is absent. In some aspects, the at least one DMRS pattern may be a first DMRS pattern or a last DMRS pattern of the plurality of DMRS patterns, the plurality of DMRS patterns may be configured via RRC signaling. In some aspects, each of the plurality of DMRS patterns may include an index and the at least one DMRS pattern may be selected based on the index for each of the plurality of DMRS patterns. In some aspects, the plurality of DMRS patterns may be configured via RRC signaling, each of the plurality of DMRS patterns including a specific configuration of a number of additional DMRS symbols. In some aspects, the at least one DMRS pattern may be selected based on a Doppler shift. In some aspects, the at least one DMRS pattern of the plurality of DMRS patterns is detected by the UE. In some aspects, one of the plurality of DMRS patterns may be a default DMRS pattern and the at least one DMRS pattern may correspond to the default DMRS pattern. In some aspects, the plurality of DMRS patterns may correspond to a plurality of DMRS mapping types. In some aspects, each of the plurality of DMRS mapping types may be associated with at least one of a DMRS type, multiple DMRS additional positions, a DMRS group, a maximum length, a scrambling ID, or a phase TRS. In some aspects, the multiple DMRS additional positions may be equal to two DMRS additional positions, the two DMRS additional positions may be configured, one of the two DMRS additional positions may be selected based on the indication of the at least one DMRS pattern. In some aspects, the indication of the at least one DMRS pattern may be based on an indication of at least one Doppler shift pre-compensation. In some aspects, the indication of one of the two DMRS patterns may be associated with a value of the at least one Doppler shift pre-compensation.

In some aspects, at 1110, the UE detects the at least one DMRS pattern of the plurality of DMRS patterns. For example, the UE 902 may detect at least one DMRS pattern of the plurality of DMRS patterns 1 or 2. In some aspects, the at least one DMRS pattern may be detected based on a DMRS configuration or a Doppler shift estimate from a TRS. In some aspects, 1110 may be performed by estimation component 1440 in FIG. 14.

In some aspects, at 1112, the UE receives, from the base station, or transmits, to the base station, data via the at least one frame structure based on the at least one DMRS pattern. For example, the UE 902 may receive, from the base station 904A or the base station 904B, or transmit, to the base station 904A or the base station 904B, data via the at least one frame structure based on the at least one DMRS pattern. In some aspects, 1112 may be performed by reception component 1430 or transmission component 1434 in FIG. 14.

FIG. 12 is a flowchart 1200 of a method of wireless communication. The method may be performed by a base station (e.g., the base station 102/180 and the base station 904A/904B; the apparatus 1502).

At 1202, the base station receives, from a UE, a frequency shift estimate including one or more frequency offsets, each of the one or more frequency offsets corresponding to each of one or more TRPs. For example, the base station 904A may receive, from a UE 902, a frequency shift estimate via the SRS 910A. In some aspects, 1202 may be performed by estimation reception component 1540 in FIG. 15. In some aspects, each of the one or more frequency offsets may correspond to a Doppler shift for each of the one or more TRPs. In some aspects, the one or more TRPs may be associated with a SFN. Each of the one or more TRPs may correspond to a same amount of DMRS symbols in each of the plurality of DMRS patterns. In some aspects, the one or more TRPs are associated with a non-single frequency network (non-SFN), each of the one or more TRPs may correspond to a different DMRS pattern of the plurality of DMRS patterns.

At 1206, the base station selects at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe. For example, the base station 904A may select at least one DMRS pattern of a plurality of DMRS patterns, such as the DMRS pattern 1 or the DMRS pattern 2, based on the frequency shift estimate. In some aspects, 1206 may be performed by pattern component 1542 in FIG. 15. In some aspects, the at least one DMRS pattern may correspond to two DMRS patterns. In some aspects, each of the plurality of DMRS patterns may be RRC configured or predefined. In some aspects, the at least one DMRS pattern may correspond to two DMRS patterns, one of the two DMRS patterns may be associated with a Doppler shift pre-compensation being enabled and another of the two DMRS patterns may be associated with the Doppler shift pre-compensation not being enabled. In some aspects, each of the two DMRS patterns may be configured based on a position and a number of one or more additional DMRS symbols. In some aspects, the at least one DMRS pattern may be selected based on one of the plurality of DMRS patterns including a highest amount of DMRS symbols. In some aspects, a specific DMRS pattern may correspond to a data transmission when an indication of a Doppler shift pre-compensation is absent. In some aspects, the at least one DMRS pattern may be a first DMRS pattern or a last DMRS pattern of the plurality of DMRS patterns, the plurality of DMRS patterns may be configured via RRC signaling. In some aspects, each of the plurality of DMRS patterns may include an index and the at least one DMRS pattern may be selected based on the index for each of the plurality of DMRS patterns. In some aspects, the plurality of DMRS patterns may be configured via RRC signaling, each of the plurality of DMRS patterns including a specific configuration of a number of additional DMRS symbols. In some aspects, the at least one DMRS pattern may be selected based on a Doppler shift. In some aspects, the at least one DMRS pattern of the plurality of DMRS patterns is detected by the UE. In some aspects, one of the plurality of DMRS patterns may be a default DMRS pattern and the at least one DMRS pattern may correspond to the default DMRS pattern. In some aspects, the plurality of DMRS patterns may correspond to a plurality of DMRS mapping types. In some aspects, each of the plurality of DMRS mapping types may be associated with at least one of a DMRS type, multiple DMRS additional positions, a DMRS group, a maximum length, a scrambling ID, or a phase TRS. In some aspects, the multiple DMRS additional positions may be equal to two DMRS additional positions, the two DMRS additional positions may be configured, one of the two DMRS additional positions may be selected based on the indication of the at least one DMRS pattern.

At 1210, the base station transmits, to the UE, an indication of the at least one DMRS pattern selected based on the frequency shift estimate. For example, the base station 904A may transmit, to the UE 902, an indication of the at least one DMRS pattern selected based on the frequency shift estimate. In some aspects, 1210 may be performed by indication transmission component 1544 in FIG. 15. In some aspects, the indication of the at least one DMRS pattern may be based on an indication of at least one Doppler shift pre-compensation. In some aspects, the indication of one of the two DMRS patterns may be associated with a value of the at least one Doppler shift pre-compensation. In some aspects, the at least one DMRS pattern may be detected based on a DMRS configuration or a Doppler shift estimate from a TRS.

FIG. 13 is a flowchart 1300 of a method of wireless communication. The method may be performed by a base station (e.g., the base station 102/180 and the base station 904A/904B; the apparatus 1502).

At 1302, the base station receives, from a UE, a frequency shift estimate including one or more frequency offsets, each of the one or more frequency offsets corresponding to each of one or more TRPs. For example, the base station 904A may receive, from a UE 902, a frequency shift estimate via the SRS 910A. In some aspects, 1302 may be performed by estimation reception component 1540 in FIG. 15. In some aspects, each of the one or more frequency offsets may correspond to a Doppler shift for each of the one or more TRPs. In some aspects, the one or more TRPs may be associated with a SFN. Each of the one or more TRPs may correspond to a same amount of DMRS symbols in each of the plurality of DMRS patterns. In some aspects, the one or more TRPs are associated with a non-single frequency network (non-SFN), each of the one or more TRPs may correspond to a different DMRS pattern of the plurality of DMRS patterns.

In some aspects, at 1304, the base station receives, from the UE, capability information associated with the plurality of DMRS patterns. For example, the base station 904A may receive, from the UE 902, capability information associated with the plurality of DMRS patterns 1 or 2. In some aspects, the capability information may be received via RRC signaling. In some aspects, 1304 may be performed by reception component 1530.

At 1306, the base station selects at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe. For example, the base station 904A may select at least one DMRS pattern of a plurality of DMRS patterns, such as the DMRS pattern 1 or the DMRS pattern 2, based on the frequency shift estimate. In some aspects, 1306 may be performed by pattern component 1542 in FIG. 15. In some aspects, the at least one DMRS pattern may correspond to two DMRS patterns. In some aspects, each of the plurality of DMRS patterns may be RRC configured or predefined. In some aspects, the at least one DMRS pattern may correspond to two DMRS patterns, one of the two DMRS patterns may be associated with a Doppler shift pre-compensation being enabled and another of the two DMRS patterns may be associated with the Doppler shift pre-compensation not being enabled. In some aspects, each of the two DMRS patterns may be configured based on a position and a number of one or more additional DMRS symbols. In some aspects, the at least one DMRS pattern may be selected based on one of the plurality of DMRS patterns including a highest amount of DMRS symbols. In some aspects, a specific DMRS pattern may correspond to a data transmission when an indication of a Doppler shift pre-compensation is absent. In some aspects, the at least one DMRS pattern may be a first DMRS pattern or a last DMRS pattern of the plurality of DMRS patterns, the plurality of DMRS patterns may be configured via RRC signaling. In some aspects, each of the plurality of DMRS patterns may include an index and the at least one DMRS pattern may be selected based on the index for each of the plurality of DMRS patterns. In some aspects, the plurality of DMRS patterns may be configured via RRC signaling, each of the plurality of DMRS patterns including a specific configuration of a number of additional DMRS symbols. In some aspects, the at least one DMRS pattern may be selected based on a Doppler shift. In some aspects, the at least one DMRS pattern of the plurality of DMRS patterns is detected by the UE. In some aspects, one of the plurality of DMRS patterns may be a default DMRS pattern and the at least one DMRS pattern may correspond to the default DMRS pattern. In some aspects, the plurality of DMRS patterns may correspond to a plurality of DMRS mapping types. In some aspects, each of the plurality of DMRS mapping types may be associated with at least one of a DMRS type, multiple DMRS additional positions, a DMRS group, a maximum length, a scrambling ID, or a phase TRS. In some aspects, the multiple DMRS additional positions may be equal to two DMRS additional positions, the two DMRS additional positions may be configured, one of the two DMRS additional positions may be selected based on the indication of the at least one DMRS pattern.

In some aspects, at 1308, the base station adjusts the at least one DMRS pattern based on the plurality of DMRS mapping types. For example, the base station 904A may adjust the at least one DMRS pattern based on the plurality of DMRS mapping types. In some aspects, 1308 may be performed by pattern component 1542 in FIG. 15.

At 1310, the base station transmits, to the UE, an indication of the at least one DMRS pattern selected based on the frequency shift estimate. For example, the base station 904A may transmit, to the UE 902, an indication of the at least one DMRS pattern selected based on the frequency shift estimate. In some aspects, 1310 may be performed by indication transmission component 1544 in FIG. 15. In some aspects, the indication of the at least one DMRS pattern may be based on an indication of at least one Doppler shift pre-compensation. In some aspects, the indication of one of the two DMRS patterns may be associated with a value of the the at least one Doppler shift pre-compensation. In some aspects, the at least one DMRS pattern may be detected based on a DMRS configuration or a Doppler shift estimate from a TRS.

In some aspects, at 1312, the base station transmits, to the UE, or receives, from the UE, data via the at least one frame structure based on the at least one DMRS pattern. For example, the base station 904A may transmit, to the UE 902, or receive, from the UE 902, data via the at least one frame structure based on the at least one DMRS pattern. In some aspects, 1312 may be performed by reception component 1530 or transmission component 1534 in FIG. 15.

Figure 14:
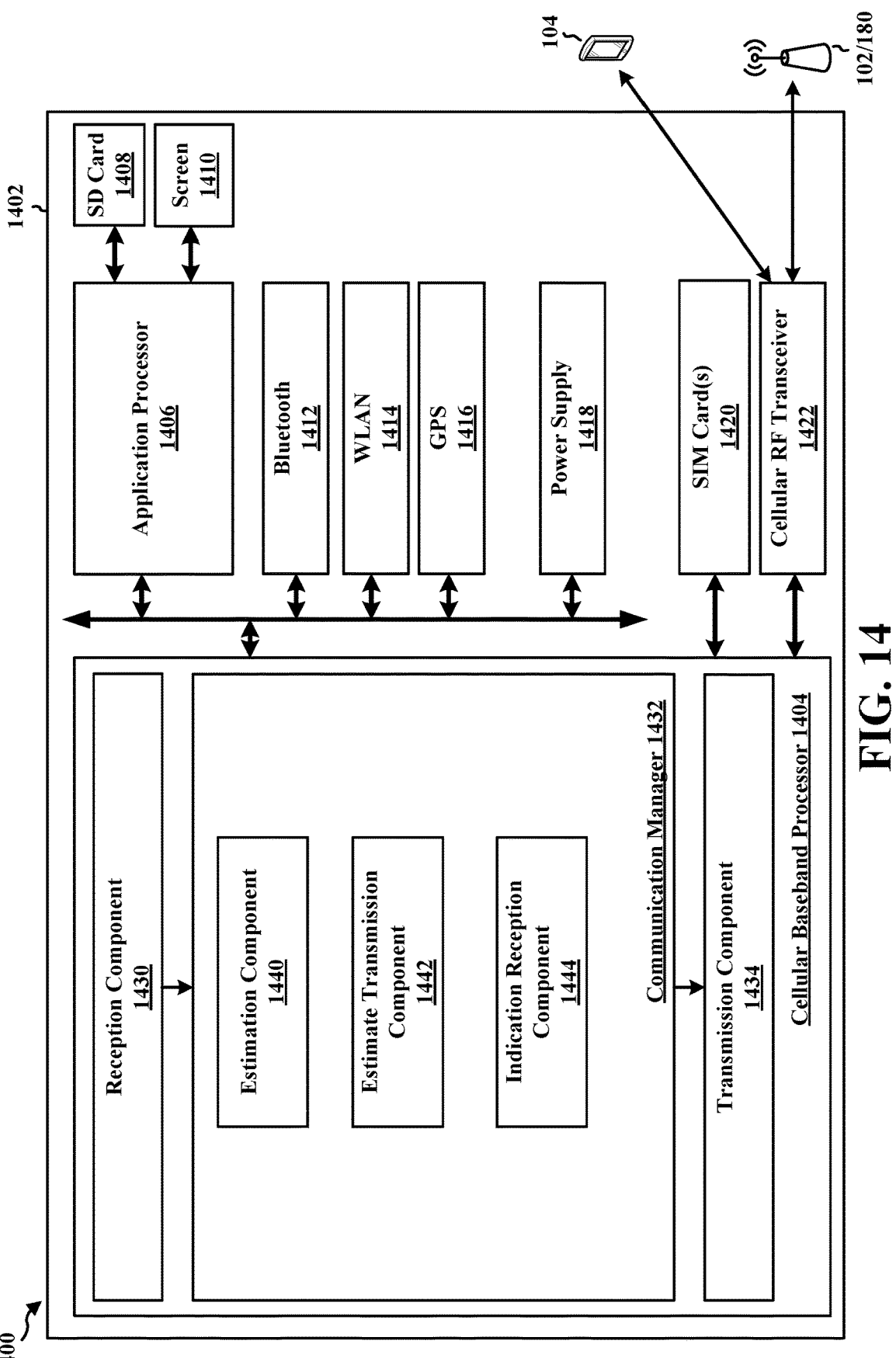
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. In some aspects, the transmission component 1434 may be configured to transmit, to the base station, capability information associated with the plurality of DMRS patterns. In some aspects, the transmission component 1434/the reception component 1430 may be configured to receive, from the base station, or transmit, to the base station, data via the at least one frame structure based on the at least one DMRS pattern. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes an estimation component 1440 that is configured to determine a frequency shift estimate including one or more frequency offsets, each of the one or more frequency offsets corresponding to each of one or more TRPs, e.g., as described in connection with 1002 in FIG. 10 or 1102 of FIG. 11. The communication manager 1432 further includes an estimate transmission component 1442 configured to transmit, to a base station, the frequency shift estimate including the one or more frequency offsets, e.g., as described in connection with 1006 in FIG. 10 or 1106 of FIG. 11. The communication manager 1432 further includes an indication reception component 1444 that is configured to receive, from the base station, an indication of at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe, e.g., as described in connection with 1008 in FIG. 10 or 1108 of FIG. 11. In some aspects, the indication reception component 1444 may be further configured to detect the at least one DMRS pattern of the plurality of DMRS patterns.

The apparatus may include additional components that perform each of the blocks of the algorithm in the aforementioned flowcharts of FIGS. 10-11. As such, each block in the aforementioned flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for determining a frequency shift estimate including one or more frequency offsets, each of the one or more frequency offsets corresponding to each of one or more TRPs. The cellular baseband processor 1404 may further include means for transmitting, to a base station, the frequency shift estimate including the one or more frequency offsets. The cellular baseband processor 1404 may further include means for receiving, from the base station, an indication of at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe. The cellular baseband processor 1404 may further include means for receiving, from the base station, or transmitting, to the base station, data via the at least one frame structure based on the at least one DMRS pattern. The cellular baseband processor 1404 may further include means for detecting the at least one DMRS pattern of the plurality of DMRS patterns. The aforementioned means may be one or more of the afore-mentioned components of the apparatus 1402 configured to perform the functions recited by the aforementioned means. As described supra, the apparatus 1402 may include the TX Processor 368, the RX Processor 356, and the controller/processor 359. As such, in one configuration, the aforemen-tioned means may be the TX Processor 368, the RX Pro-cessor 356, and the controller/processor 359 configured to perform the functions recited by the aforementioned means.

Figure 15:
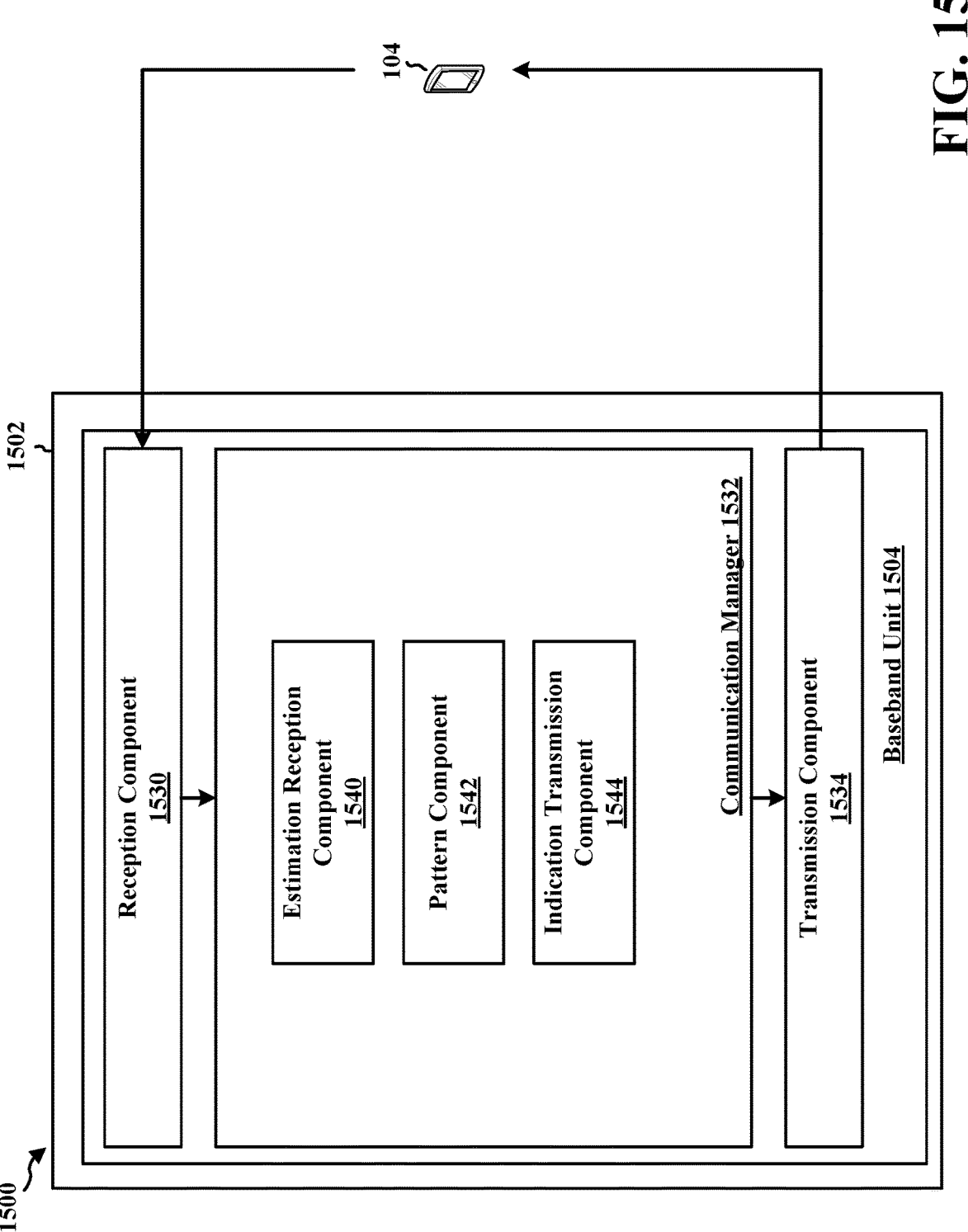
FIG. 15 is a diagram illustrating an example of a hardware implementation for an example apparatus.

FIG. 15 is a diagram 1500 illustrating an example of a hardware implementation for an apparatus 1502. The appa-ratus 1502 is a BS and includes a baseband unit 1504. The baseband unit 1504 may communicate through a cellular RF transceiver with the UE 104. The baseband unit 1504 may include a computer-readable medium/memory. The base-band unit 1504 is responsible for general processing, includ-ing the execution of software stored on the computer-readable medium/memory. The software, when executed by the baseband unit 1504, causes the baseband unit 1504 to perform the various functions described supra. The com-puter-readable medium/memory may also be used for stor-ing data that is manipulated by the baseband unit 1504 when executing software. The baseband unit 1504 further includes a reception component 1530, a communication manager 1532, and a transmission component 1534. In some aspects, the reception component 1530 may be configured to receive, from a UE, capability information associated with the plu-rality of DMRS patterns, e.g., as described in connection with 1104 in FIG. 11. In some aspects, the reception com-ponent 1530 and the transmission component 1534 may be configured to transmit, to the UE, or receive, from the UE, data via the at least one frame structure based on the at least one DMRS pattern. The communication manager 1532 includes the one or more illustrated components. The com-ponents within the communication manager 1532 may be stored in the computer-readable medium/memory and/or configured as hardware within the baseband unit 1504. The baseband unit 1504 may be a component of the BS 310 and may include the memory 376 and/or at least one of the TX processor 316, the RX processor 370, and the controller/processor 375.

The communication manager 1532 includes an estimation reception component 1540 that receives, from a UE, a frequency shift estimate including one or more frequency offsets, each of the one or more frequency offsets corre-sponding to each of one or more TRPs, e.g., as described in connection with 1202 in FIG. 12 or 1302 in FIG. 13. The communication manager 1532 further includes a pattern component 1542 that selects at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe, e.g., as described in connection with 1206 in FIG. 12 or 1306 in FIG. 13. In some aspects, the pattern component 1542 may be configured to adjust the at least one DMRS pattern based on the plurality of DMRS mapping types. The communication manager 1532 further includes an indication transmission component 1544 that transmits, to the UE, an indication of the at least one DMRS pattern selected based on the frequency shift estimate, e.g., as described in connection with 1210 in FIG. 12 or 1310 in FIG. 13.

The apparatus may include additional components that perform each of the blocks of the algorithm in the afore-mentioned flowcharts of FIGS. 12-13. As such, each block in the aforementioned flowchart of FIGS. 12-13 may be performed by a component and the apparatus may include one or more of those components. The components may be one or more hardware components specifically configured to carry out the stated processes/algorithm, implemented by a processor configured to perform the stated processes/algo-rithm, stored within a computer-readable medium for imple-mentation by a processor, or some combination thereof.

In one configuration, the apparatus 1502, and in particular the baseband unit 1504, includes means for receiving, from a UE, a frequency shift estimate including one or more frequency offsets, each of the one or more frequency offsets corresponding to each of one or more TRPs. The baseband unit 1504 may further include means for selecting at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe. The baseband unit 1504 may further include means for transmitting, to the UE, an indication of the at least one DMRS pattern selected based on the frequency shift estimate. The baseband unit 1504 may further include means for receiving, from the UE, capability information associated with the plurality of DMRS patterns. The baseband unit 1504 may further include means for transmitting, to the UE, or receiving, from the UE, data via the at least one frame structure based on the at least one DMRS pattern. The baseband unit 1504 may further include means for adjusting the at least one DMRS pattern based on the plurality of DMRS mapping types. The aforementioned means may be one or more of the afore-mentioned components of the apparatus 1502 configured to perform the functions recited by the aforementioned means. As described supra, the apparatus 1502 may include the TX Processor 316, the RX Processor 370, and the controller/processor 375. As such, in one configuration, the aforemen-tioned means may be the TX Processor 316, the RX Pro-cessor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station, comprising: a memory; and at least one processor coupled to the memory and configured to: receive, from a UE, a frequency shift estimate including one or more frequency offsets, each of the one or more frequency offsets corresponding to each of one or more TRPs; select at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe; and transmit, to the UE, an indication of the at least one DMRS pattern selected based on the frequency shift estimate.

Aspect 2 is the apparatus of aspect 1, wherein the indication of the at least one DMRS pattern is based on an indication of at least one Doppler shift pre-compensation.

Aspect 3 is the apparatus of any of aspects 1-2, wherein the at least one DMRS pattern corresponds to two DMRS patterns, the indication of one of the two DMRS patterns being associated with a value of the at least one Doppler shift pre-compensation.

Aspect 4 is the apparatus of any of aspects 1-3, wherein the at least one processor is further configured to: transmit, to the UE, or receiving, from the UE, data via the at least one frame structure based on the at least one DMRS pattern.

Aspect 5 is the apparatus of any of aspects 1-4, wherein the at least one DMRS pattern corresponds to two DMRS patterns, one of the two DMRS patterns associated with a Doppler shift pre-compensation being enabled and another of the two DMRS patterns associated with the Doppler shift pre-compensation not being enabled.

Aspect 6 is the apparatus of any of aspects 1-5, wherein each of the two DMRS patterns are configured based on a position and a number of one or more additional DMRS symbols.

Aspect 7 is the apparatus of any of aspects 1-6, wherein the at least one DMRS pattern is selected based on one of the plurality of DMRS patterns including a highest amount of DMRS symbols.

Aspect 8 is the apparatus of any of aspects 1-7, wherein a specific DMRS pattern corresponds to a data transmission when an indication of a Doppler shift pre-compensation is absent, and wherein the at least one DMRS pattern is a first DMRS pattern or a last DMRS pattern of the plurality of DMRS patterns, the plurality of DMRS patterns being configured via RRC signaling.

Aspect 9 is the apparatus of any of aspects 1-8, wherein the plurality of DMRS patterns corresponds to a plurality of DMRS mapping types, and wherein each of the plurality of DMRS mapping types is associated with at least one of a DMRS type, multiple DMRS additional positions, a DMRS group, a maximum length, a scrambling ID, or a phase tracking RS.

Aspect 10 is the apparatus of any of aspects 1-9, wherein the at least one processor is further configured to: adjust the at least one DMRS pattern based on the plurality of DMRS mapping types.

Aspect 11 is the apparatus of any of aspects 1-10, wherein each of the one or more frequency offsets corresponds to a Doppler shift for each of the one or more TRPs, and wherein the one or more TRPs are associated with a SFN, each of the one or more TRPs corresponding to a same amount of DMRS symbols in each of the plurality of DMRS patterns.

Aspect 12 is the apparatus of any of aspects 1-11, wherein each of the one or more frequency offsets corresponds to a Doppler shift for each of the one or more TRPs, and wherein the one or more TRPs are associated with a non-SFN, each of the one or more TRPs corresponding to a different DMRS pattern of the plurality of DMRS patterns.

Aspect 13 is the apparatus of any of aspects 1-12, wherein each of the one or more frequency offsets corresponds to a Doppler shift for each of the one or more TRPs, and wherein the plurality of DMRS patterns are configured via RRC signaling, each of the plurality of DMRS patterns including a specific configuration of a number of additional DMRS symbols.

Aspect 14 is the apparatus of any of aspects 1-13, wherein each of the one or more frequency offsets corresponds to a Doppler shift for each of the one or more TRPs, and wherein the at least one DMRS pattern is selected based on at least one Doppler shift.

Aspect 15 is the apparatus of any of aspects 1-14, wherein the at least one DMRS pattern of the plurality of DMRS patterns is detected by the UE, and wherein the at least one DMRS pattern is detected based on a DMRS configuration or a Doppler shift estimate from a TRS.

Aspect 16 is an apparatus for wireless communication at a UE, comprising: a memory; and at least one processor coupled to the memory and configured to: determine a frequency shift estimate including one or more frequency offsets, each of the one or more frequency offsets corresponding to each of one or more TRPs; transmit, to a base station, the frequency shift estimate including the one or more frequency offsets; and receive, from the base station, an indication of at least one DMRS pattern of a plurality of DMRS patterns based on the frequency shift estimate, the at least one DMRS pattern including a plurality of DMRS symbols, the at least one DMRS pattern associated with at least one frame structure including a plurality of slots in a subframe.

Aspect 17 is the apparatus of aspect 16, wherein the indication of the at least one DMRS pattern is based on an indication of at least one Doppler shift pre-compensation.

Aspect 18 is the apparatus of any of aspects 16-186, wherein the at least one DMRS pattern corresponds to two DMRS patterns, the indication of one of the two DMRS patterns being associated with a value of the at least one Doppler shift pre-compensation.

Aspect 19 is the apparatus of any of aspects 16-18, wherein the at least one processor is further configured to: transmit, to the base station, or receive, from the base station, data via the at least one frame structure based on the at least one DMRS pattern.

Aspect 20 is the apparatus of any of aspects 16-19, wherein the at least one DMRS pattern corresponds to two DMRS patterns, one of the two DMRS patterns associated with a Doppler shift pre-compensation being enabled and another of the two DMRS patterns associated with the Doppler shift pre-compensation not being enabled.

Aspect 21 is the apparatus of any of aspects 16-20, wherein each of the two DMRS patterns are configured based on a position and a number of one or more additional DMRS symbols.

Aspect 22 is the apparatus of any of aspects 16-21, wherein the at least one DMRS pattern is selected based on one of the plurality of DMRS patterns including a highest amount of DMRS symbols.

Aspect 23 is the apparatus of any of aspects 16-22, wherein a specific DMRS pattern corresponds to a data transmission when an indication of a Doppler shift pre-compensation is absent, and wherein the at least one DMRS pattern is a first DMRS pattern or a last DMRS pattern of the plurality of DMRS patterns, the plurality of DMRS patterns being configured via RRC signaling.

Aspect 24 is the apparatus of any of aspects 16-23, wherein the plurality of DMRS patterns corresponds to a plurality of DMRS mapping types, and wherein each of the plurality of DMRS mapping types is associated with at least one of a DMRS type, multiple DMRS additional positions, a DMRS group, a maximum length, a scrambling ID, or a phase tracking RS.

Aspect 25 is the apparatus of any of aspects 16-24, wherein each of the one or more frequency offsets corresponds to a Doppler shift for each of the one or more TRPs, and wherein the one or more TRPs are associated with a SFN, each of the one or more TRPs corresponding to a same amount of DMRS symbols in each of the plurality of DMRS patterns.

Aspect 26 is the apparatus of any of aspects 16-25, wherein each of the one or more frequency offsets corresponds to a Doppler shift for each of the one or more TRPs, and wherein the one or more TRPs are associated with a non-SFN, each of the one or more TRPs corresponding to a different DMRS pattern of the plurality of DMRS patterns.

Aspect 27 is the apparatus of any of aspects 16-26, wherein each of the one or more frequency offsets corresponds to a Doppler shift for each of the one or more TRPs, and wherein the plurality of DMRS patterns are configured via RRC signaling, each of the plurality of DMRS patterns including a specific configuration of a number of additional DMRS symbols.

Aspect 28 is the apparatus of any of aspects 16-27, wherein each of the one or more frequency offsets corresponds to a Doppler shift for each of the one or more TRPs, and wherein the at least one DMRS pattern is selected based on at least one Doppler shift.

Aspect 29 is a method of wireless communication for implementing any of aspects 1 to 14.

Aspect 30 is an apparatus for wireless communication including means for implementing any of aspects 1 to 14.

Aspect 31 is a computer-readable medium storing computer executable code, where the code when executed by a processor causes the processor to implement any of aspects 1 to 14.

Aspect 32 is a method of wireless communication for implementing any of aspects 15 to 28.

Aspect 33 is an apparatus for wireless communication including means for implementing any of aspects 15 to 28.

Aspect 34 is a computer-readable medium storing computer executable code, where the code when executed by a processor causes the processor to implement any of aspects 15 to 28.

What is claimed is:

1. An apparatus for wireless communication at a base station, comprising:
   memory; and
   at least one processor coupled to the memory and configured to:
      receive, from a user equipment (UE), a frequency shift estimate including one or more frequency offsets, each of the one or more frequency offsets corresponding to each of one or more transmission reception points (TRPs);
      receive, from the UE, a capability indication indicating a support of multiple demodulation reference signal (DMRS) patterns;
      transmit, for the UE based on the capability indication, a configuration of a plurality of DMRS patterns;
      select at least one DMRS pattern of the plurality of DMRS patterns based on the frequency shift estimate, the at least one DMRS pattern including a plurality of DMRS symbols, the at least one DMRS pattern associated with at least one frame structure including a plurality of slots in a subframe; and
      transmit, to the UE, an indication of the at least one DMRS pattern selected based on the frequency shift estimate.

2. The apparatus of claim 1, wherein the indication of the at least one DMRS pattern is based on an indication of at least one Doppler shift pre-compensation.

3. The apparatus of claim 2, wherein the at least one DMRS pattern corresponds to two DMRS patterns, the indication of one of the two DMRS patterns being associated with a value of the at least one Doppler shift pre-compensation.

4. The apparatus of claim 1, wherein the at least one processor is further configured to:
   transmit, to the UE, or receiving, from the UE, data via the at least one frame structure based on the at least one DMRS pattern.

5. The apparatus of claim 1, wherein the at least one DMRS pattern corresponds to two DMRS patterns, one of the two DMRS patterns associated with a Doppler shift pre-compensation being enabled and another of the two DMRS patterns associated with the Doppler shift pre-compensation not being enabled.

6. The apparatus of claim 5, wherein each of the two DMRS patterns are configured based on a position and a number of one or more additional DMRS symbols.

7. The apparatus of claim 1, wherein the at least one DMRS pattern is selected based on one of the plurality of DMRS patterns including a highest amount of DMRS symbols.

8. The apparatus of claim 1, wherein a specific DMRS pattern corresponds to a data transmission when an indication of a Doppler shift pre-compensation is absent, and wherein the at least one DMRS pattern is a first DMRS pattern or a last DMRS pattern of the plurality of DMRS patterns, the plurality of DMRS patterns being configured via radio resource control (RRC) signaling.

9. The apparatus of claim 1, wherein the plurality of DMRS patterns corresponds to a plurality of DMRS mapping types, and wherein each of the plurality of DMRS mapping types is associated with at least one of a DMRS type, multiple DMRS additional positions, a DMRS group, a maximum length, a scrambling identifier (ID), or a phase tracking reference signal (RS).

10. The apparatus of claim 9, wherein the at least one processor is further configured to:
adjust the at least one DMRS pattern based on the plurality of DMRS mapping types.

11. The apparatus of claim 1, wherein each of the one or more frequency offsets corresponds to a Doppler shift for each of the one or more TRPs, and wherein the one or more TRPs are associated with a single frequency network (SFN), each of the one or more TRPs corresponding to a same amount of DMRS symbols in each of the plurality of DMRS patterns.

12. The apparatus of claim 1, wherein each of the one or more frequency offsets corresponds to a Doppler shift for each of the one or more TRPs, and wherein the one or more TRPs are associated with a non-single frequency network (non-SFN), each of the one or more TRPs corresponding to a different DMRS pattern of the plurality of DMRS patterns.

13. The apparatus of claim 1, wherein each of the one or more frequency offsets corresponds to a Doppler shift for each of the one or more TRPs, and wherein the plurality of DMRS patterns are configured via radio resource control (RRC) signaling, each of the plurality of DMRS patterns including a specific configuration of a number of additional DMRS symbols.

14. The apparatus of claim 1, wherein each of the one or more frequency offsets corresponds to a Doppler shift for each of the one or more TRPs, and wherein the at least one DMRS pattern is selected based on at least one Doppler shift.

15. The apparatus of claim 1, wherein the at least one DMRS pattern of the plurality of DMRS patterns is detected by the UE, and wherein the at least one DMRS pattern is detected based on a DMRS configuration or a Doppler shift estimate from a tracking reference signal (TRS).

16. An apparatus for wireless communication at a user equipment (UE), comprising:
memory; and
at least one processor coupled to the memory and configured to:
determine a frequency shift estimate including one or more frequency offsets, each of the one or more frequency offsets corresponding to each of one or more transmission reception points (TRPs);
transmit, to a base station, the frequency shift estimate including the one or more frequency offsets;
transmit, to the base station, a capability indication indicating a support of multiple demodulation reference signal (DMRS) patterns;

receive, from the base station based on the capability indication, a configuration of a plurality of DMRS patterns; and
receive, from the base station, an indication of at least one DMRS pattern of the plurality of DMRS patterns based on the frequency shift estimate, the at least one DMRS pattern including a plurality of DMRS symbols, the at least one DMRS pattern associated with at least one frame structure including a plurality of slots in a subframe.

17. The apparatus of claim 16, wherein the indication of the at least one DMRS pattern is based on an indication of at least one Doppler shift pre-compensation.

18. The apparatus of claim 17, wherein the at least one DMRS pattern corresponds to two DMRS patterns, the indication of one of the two DMRS patterns being associated with a value of the at least one Doppler shift pre-compensation.

19. The apparatus of claim 16, wherein the at least one processor is further configured to:
transmit, to the base station, or receive, from the base station, data via the at least one frame structure based on the at least one DMRS pattern.

20. The apparatus of claim 16, wherein the at least one DMRS pattern corresponds to two DMRS patterns, one of the two DMRS patterns associated with a Doppler shift pre-compensation being enabled and another of the two DMRS patterns associated with the Doppler shift pre-compensation not being enabled.

21. The apparatus of claim 20, wherein each of the two DMRS patterns are configured based on a position and a number of one or more additional DMRS symbols.

22. The apparatus of claim 16, wherein the at least one DMRS pattern is selected based on one of the plurality of DMRS patterns including a highest amount of DMRS symbols.

23. The apparatus of claim 16, wherein a specific DMRS pattern corresponds to a data transmission when an indication of a Doppler shift pre-compensation is absent, and wherein the at least one DMRS pattern is a first DMRS pattern or a last DMRS pattern of the plurality of DMRS patterns, the plurality of DMRS patterns being configured via radio resource control (RRC) signaling.

24. The apparatus of claim 16, wherein the plurality of DMRS patterns corresponds to a plurality of DMRS mapping types, and wherein each of the plurality of DMRS mapping types is associated with at least one of a DMRS type, multiple DMRS additional positions, a DMRS group, a maximum length, a scrambling identifier (ID), or a phase tracking reference signal (RS).

25. The apparatus of claim 16, wherein each of the one or more frequency offsets corresponds to a Doppler shift for each of the one or more TRPs, and wherein the one or more TRPs are associated with a single frequency network (SFN), each of the one or more TRPs corresponding to a same amount of DMRS symbols in each of the plurality of DMRS patterns.

26. The apparatus of claim 16, wherein each of the one or more frequency offsets corresponds to a Doppler shift for each of the one or more TRPs, and wherein the one or more TRPs are associated with a non-single frequency network (non-SFN), each of the one or more TRPs corresponding to a different DMRS pattern of the plurality of DMRS patterns.

27. The apparatus of claim 16, wherein each of the one or more frequency offsets corresponds to a Doppler shift for each of the one or more TRPs, and wherein the plurality of DMRS patterns are configured via radio resource control (RRC) signaling, each of the plurality of DMRS patterns including a specific configuration of a number of additional DMRS symbols.

28. The apparatus of claim 16, wherein each of the one or more frequency offsets corresponds to a Doppler shift for each of the one or more TRPs, and wherein the at least one DMRS pattern is selected based on at least one Doppler shift.

29. A method of wireless communication of a user equipment (UE), comprising:

determining a frequency shift estimate including one or more frequency offsets, each of the one or more frequency offsets corresponding to each of one or more transmission reception points (TRPs);

transmitting, to a base station, the frequency shift estimate including the one or more frequency offsets;

transmitting, to the base station, a capability indication indicating a support of multiple demodulation reference signal (DMRS) patterns;

receiving, from the base station based on the capability indication, a configuration of a plurality of DMRS patterns; and receiving, from the base station, an indication of at least one DMRS pattern of the plurality of DMRS patterns based on the frequency shift estimate, the at least one DMRS pattern including a plurality of DMRS symbols, the at least one DMRS pattern associated with at least one frame structure including a plurality of slots in a subframe.

30. A method of wireless communication of a base station, comprising:

receiving, from a user equipment (UE), a frequency shift estimate including one or more frequency offsets, each of the one or more frequency offsets corresponding to each of one or more transmission reception points (TRPs);

receiving, from the UE, a capability indication indicating a support of multiple demodulation reference signal (DMRS) patterns;

transmitting, for the UE based on the capability indication, a configuration of a plurality of DMRS patterns;

selecting at least one DMRS pattern of the plurality of DMRS patterns based on the frequency shift estimate, the at least one DMRS pattern including a plurality of DMRS symbols, the at least one DMRS pattern associated with at least one frame structure including a plurality of slots in a subframe; and transmitting, to the UE, an indication of the at least one DMRS pattern selected based on the frequency shift estimate.

* * * * *